United States Patent
Gårdsrud et al.

(10) Patent No.: US 10,486,355 B2
(45) Date of Patent: Nov. 26, 2019

(54) METHOD AND EQUIPMENT FOR PRODUCTION OF A PINCH LINE FREE LINER

(71) Applicant: Hexagon Raufoss AS, Raufoss (NO)

(72) Inventors: Hans Øyvind Gårdsrud, Gjøvik (NO); Pierre Thévenard, Raufoss (NO)

(73) Assignee: HEXAGON TECHNOLOGY AS, Alesund (NO)

( * ) Notice: Subject to any disclaimer, the term of this patent is extended or adjusted under 35 U.S.C. 154(b) by 249 days.

(21) Appl. No.: 15/515,822

(22) PCT Filed: Oct. 13, 2015

(86) PCT No.: PCT/EP2015/073647
§ 371 (c)(1),
(2) Date: Mar. 30, 2017

(87) PCT Pub. No.: WO2016/059036
PCT Pub. Date: Apr. 21, 2016

(65) Prior Publication Data
US 2017/0246791 A1    Aug. 31, 2017

(30) Foreign Application Priority Data

Oct. 14, 2014 (NO) .................................. 20141228

(51) Int. Cl.
*B29C 49/42* (2006.01)
*B29C 49/48* (2006.01)
(Continued)

(52) U.S. Cl.
CPC .............. *B29C 49/04* (2013.01); *B29C 49/42* (2013.01); *B29C 49/4273* (2013.01);
(Continued)

(58) Field of Classification Search
CPC . B29C 49/4278; B29C 49/4273; B29C 49/50; B29C 49/60; B29C 2049/6072; B29C 49/4817; B29C 49/482
See application file for complete search history.

(56) References Cited

U.S. PATENT DOCUMENTS 3,032,809 A * 5/1962 Willard .................. B29C 49/76
264/533
4,028,034 A    6/1977 Hahn
(Continued)

FOREIGN PATENT DOCUMENTS

CA    1 213 764    11/1986
GB      898377     6/1962
(Continued)

OTHER PUBLICATIONS

International Search Report dated Feb. 23, 2016 in International (PCT) Application No. PCT/EP2015/073647.
(Continued)

*Primary Examiner* — Robert B Davis
(74) *Attorney, Agent, or Firm* — Wenderoth, Lind & Ponack, L.L.P.

(57) ABSTRACT

Method of blow moulding a container from a hollow, elongated parison of a thermoplastic material, wherein the method comprises: —arranging the parison in a closed moulding equipment comprising a moulding cavity and at least one aperture, wherein the at least one aperture provides an opening into the moulding cavity from outside the closed moulding equipment, wherein the circumference of the at least one aperture is larger than or equal to a circumference of the parison, such that a first section of the parison is arranged inside the moulding cavity, a second section of the parison is arranged within the at least one aperture and a third section of the parison is arranged outside the closed moulding equipment, —closing a shutter system around the
(Continued)

third section of the parison, thereby pinching the parison and providing a closed volume inside the first and second sections of the parison, —arranging a blow conduit in fluid communication with the closed volume inside the second section of the parison, —blowing pressurised gas from the blow conduit into the first and the second section of the parison, thereby forming first and second blow moulded sections, wherein the first blow moulded section is the container, and—separating the second blow moulded section from the first blow moulded section, thereby providing an opening in the container.

19 Claims, 7 Drawing Sheets

(51) Int. Cl.
  *B29C 49/50* (2006.01)
  *B29C 49/60* (2006.01)
  *B29C 49/04* (2006.01)
  *B29L 31/00* (2006.01)
  *B29C 49/44* (2006.01)
  *B29K 101/12* (2006.01)
  *B29K 105/00* (2006.01)

(52) U.S. Cl.
  CPC .......... *B29C 49/4278* (2013.01); *B29C 49/50* (2013.01); *B29C 49/60* (2013.01); *B29C 49/44* (2013.01); *B29C 2049/6072* (2013.01); *B29K 2101/12* (2013.01); *B29K 2105/258* (2013.01); *B29L 2031/7158* (2013.01)

(56) References Cited

U.S. PATENT DOCUMENTS

| | | | | |
|---|---|---|---|---|
| 4,178,146 | A | * | 12/1979 | Kinsley .................. B29C 49/50 425/289 |
| 4,950,153 | A | | 8/1990 | Dundas et al. |
| 5,068,075 | A | | 11/1991 | Dundas et al. |
| 5,466,413 | A | | 11/1995 | Richter et al. |
| 5,901,865 | A | * | 5/1999 | Weiler ................ B65D 23/003 215/46 |
| 7,679,785 | B2 | | 3/2010 | Ehbets et al. |
| 2003/0090024 | A1 | | 5/2003 | Skov et al. |
| 2009/0258105 | A1 | | 10/2009 | Thierjung et al. |

FOREIGN PATENT DOCUMENTS

| | | |
|---|---|---|
| JP | 62-51424 | 3/1987 |
| JP | 3-151223 | 6/1991 |
| NO | 20130258 | 8/2014 |
| WO | 98/34063 | 8/1998 |
| WO | 00/66939 | 11/2000 |

OTHER PUBLICATIONS

Search Report dated Apr. 14, 2015 in Norwegian Application No. 20141228.

Office Action dated Jun. 5, 2019 in Japanese Application No. 2017-519230, with English translation thereof.

* cited by examiner

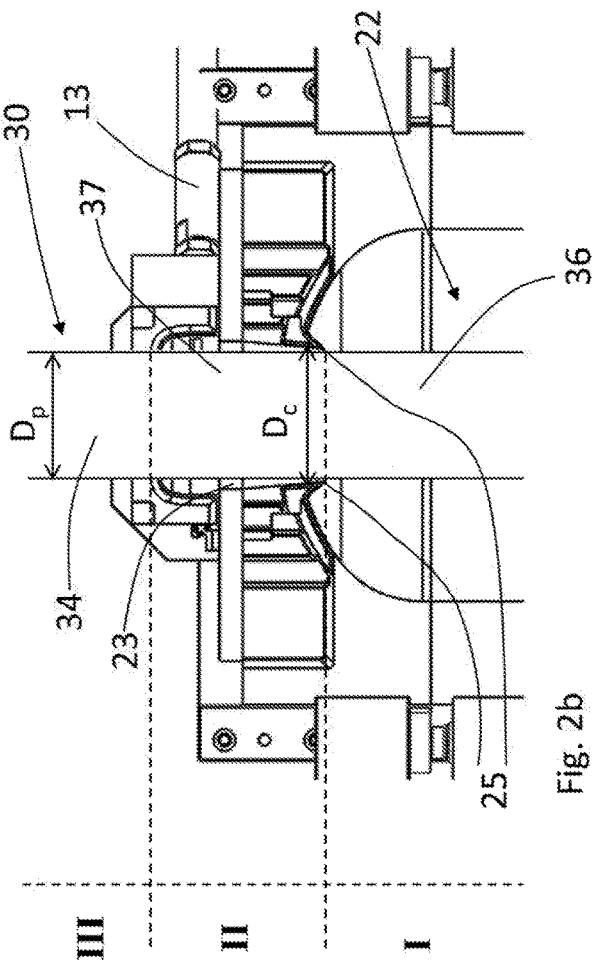
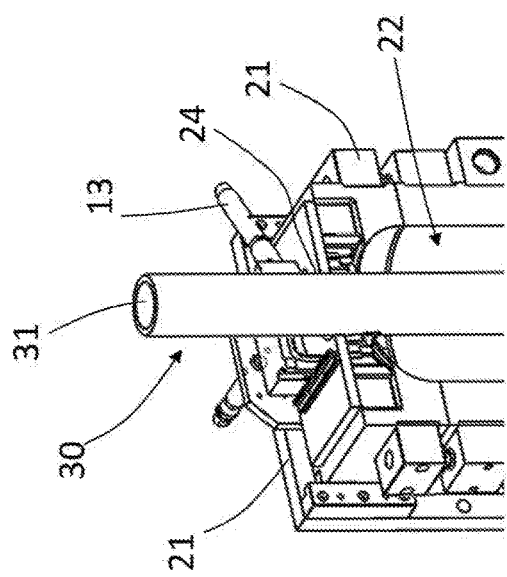
Fig. 2a
Fig. 2b

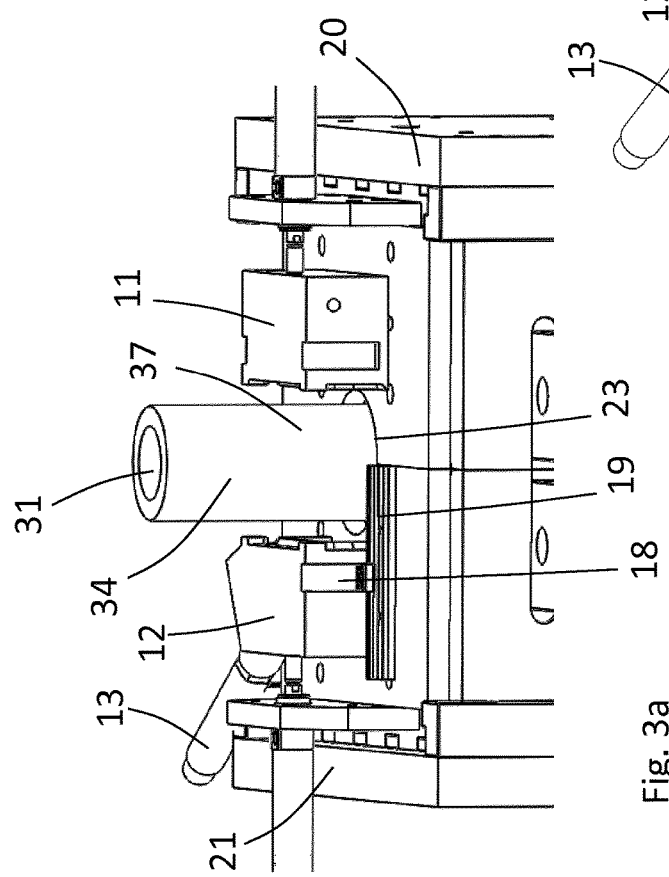
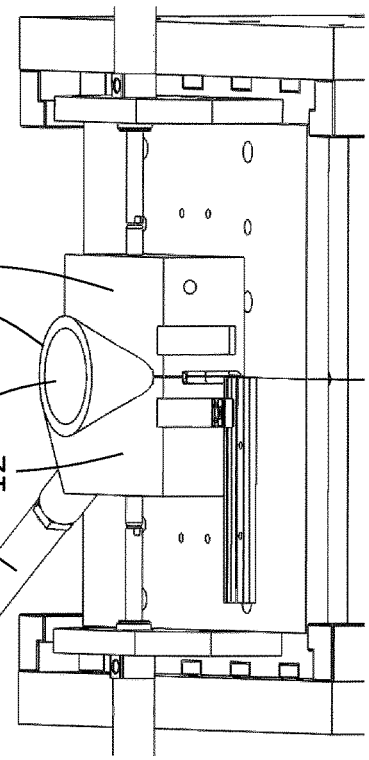
Fig. 3a
Fig. 3b

METHOD AND EQUIPMENT FOR PRODUCTION OF A PINCH LINE FREE LINER

The present invention relates to a method of blow molding a container as well as equipment adapted to perform the method. More specifically the present invention relates to a method for producing a pinch line free liner for a composite pressure container and equipment for performing the method.

BACKGROUND

A common type of composite pressure containers consist of an internal fluid tight liner, at least one boss connected thereto for installation of a valve, safety device, or similar connection devices for filling or emptying of the container. On the outside of the liner one or more reinforcement layers are arranged to provide the container with the necessary strength to store fluid under a desired pressure. These types of containers are for instance disclosed in WO00/66939 and WO98/34063 where the reinforcement layer comprises resin coated fibres.

PRIOR ART

The liner for the pressure containers have traditionally been produced by blow moulding. The process of conventional blow moulding is well known in the art. The material to form a hollow or partly hollow article is provided in the form of a parison. A blow pin is inserted in the parison which is arranged in a mould cavity. Pressurized gas is fed into the parison through the blow pin forcing the parison to expand until it reaches the walls of the mould cavity.

For the blow moulding of generally bottle shaped containers with an elongated shape and an opening for filling and discharging arranged at one end thereof. The parison normally has the form of a tube which is open at both ends. This parison is arranged over the blow pin and the mould cavity is closed around parison so that the parison at both ends thereof is sealed gas tight by the closing of the mould cavity. The parison is accordingly squeezed or pinched and welded by the closing edges of the mould cavity. This area of the blow moulded object will, after the moulding process is completed, result in a so called pinch line in the moulded object. The material properties such as the thickness of the material will vary in the pinch line area compared to the areas remote from the pinch line. This uneven thickness may influence the reliability of the container to store fluid under pressure. Further the pinch line in the area surrounding the opening makes the outer surface of the moulded object uneven and non-smooth often with dents at the ends of the pinch line.

When blow moulding liners for composite pressure containers the boss is normally arranged around the opening remaining in the liner where the blow pin was inserted. Accordingly the boss is fastened to the liner by welding, gluing or mechanically fixed in the area comprising the pinch line. The unevenness of the pinch line makes the securing of the boss to the liner difficult and providing a smoother outer surface surrounding the opening would be desirable to make the installation of the boss more efficient.

In the conventional method the rest of the parison situated outside the moulding cavity during moulding has to be removed from the moulded liner in a separated operational step after completion of the moulding process.

NO20130258 discloses a method of producing a pinch line free liner by comprising simultaneously blowing pressurised gas from a blow pin into the parison and expanding the outer cross sectional diameter of the blow pin.

OBJECTIVES OF THE INVENTION

The objective of the present invention is to provide an alternative method for blow moulding a liner reducing or eliminating the presence of one or more pinch lines.

A further objective is to provide a method and system that eliminates the pinch line at both ends of a cylindrical liner.

A further objective is to provide a blow moulding device adapted to perform the method according to the present invention.

A further objective is to provide a method and device which eliminates or limits the need for additional steps to obtain a liner ready for installation of a boss.

This and other objectives are obtained by a method of blow moulding a container from a hollow, elongated parison of a thermoplastic material, wherein the method comprises:

arranging the parison in a closed moulding equipment comprising a moulding cavity and at least one aperture, wherein the at least one aperture provides an opening into the moulding cavity from outside the closed moulding equipment, wherein the circumference of the at least one aperture is larger than or equal to a circumference of the parison, such that a first section of the parison is arranged inside the moulding cavity, a second section of the parison is arranged within the at least one aperture and a third section of the parison is arranged outside the closed moulding equipment, closing a shutter system around the third section of the parison, thereby pinching the parison and providing a closed volume inside the first and second sections of the parison, arranging a blow conduit in fluid communication with the closed volume inside the second section of the parison, blowing pressurised gas from the blow conduit into the first and the second sections of the parison, thereby forming first and second blow moulded sections, wherein the first blow moulded section is the container, and separating the second blow moulded section from the first blow moulded section, thereby providing an opening in the container. The next step in the method would normally comprise opening the moulding cavity to remove the container.

The feature that the circumference of the at least one aperture is larger than or equal to a circumference of the parison provides for arrangement of the parison within the aperture such that pinching of the section of the parison arranged within the aperture is avoided. The moulding equipment can be closed before the parison is arranged therein or the equipment can be closed around the parison either way the larger diameter of the circumference of the aperture provides for the pinch-free arrangement of the parison within the moulding equipment.

In a preferred embodiment the container is a liner for a composite pressure container.

In a preferred embodiment the at least one aperture is a circular aperture.

In one aspect of the method according to the present invention the second blow moulded section is separated from the first blow moulded section before the moulding cavity is opened to remove the container. In a preferred aspect the separating comprises cutting a connection between the first and the second moulded sections with a cutting edge arranged between the moulding cavity and the at least one aperture.

In another aspect of the method according to the present invention, the method comprises supplying support air through an opening of the parison before closing the shutter system. In a preferred aspect the method comprises supplying the support air through an extruding die, wherein the parison is being extruded from the extruding die.

In yet another aspect of the method the parison is tube shaped. The tube shaped parison is preferably extruded into the moulding equipment. At least one end of the tube shaped parison is handled according to the present invention securing that no pinch line is formed at said at least one end. The other end of the tube shaped parison may be handled similarly or may be pinched by the mould parts when these are joined to form the moulding cavity.

In a further aspect the blow conduit is a blow needle and the method comprises
  puncturing the parison with the blow needle after closing the shutter system and
  retracting the blow needle before separating the second blow moulded section from the first blow moulded section.

In another aspect of the method the blow conduit is arranged inside the hollow parison before closing the shutter system.

In yet another embodiment the moulding cavity and the aperture are formed by at least two mould parts being joined and wherein the method comprises joining the mould parts before or after arrangement of the parison, wherein the first, second and third sections of the parison are pinch free after the joining of the mould parts.

In further aspect the closing of the shutter system is performed after the arrangement of the parison and after the joining of the mould parts.

The parison can be made of any applicable thermoplastic material. The parison may consist of one material or may be made up of a number of co-extruded layers, such as 2, 3, 4, 5, 6 or 7 layers.

In another aspect the present invention provides blow moulding equipment comprising
  a moulding cavity,
  at least one aperture in communication with the moulding cavity and comprising an entrance arranged outside of the moulding cavity,
  a shutter system arranged at the entrance to the at least one aperture on the outside of the moulding cavity, wherein the shutter system is configured to reversible close and open, and during use when closed to pinch a parison protruding from said at least one aperture, and
  at least one blow conduit adapted for providing pressurised gas to the inside of a hollow parison to be arranged within the blow moulding equipment,
  wherein the moulding cavity and the aperture are formed by at least two mould parts to be joined together to form a closed blow moulding equipment and wherein the blow moulding equipment is arranged for joining the mould parts before closing of the shutter system.

In one aspect the blow moulding equipment is arranged for sequential joining of the mould parts thereby closing the mould equipment before closing of the shutter system.

In a further aspect of the blow moulding equipment according to the present invention the circumference of the at least one aperture is larger than or equal to the circumference of a parison intended for blow moulding in the blow moulding equipment, such that when the equipment is in use the parison is not pinch in the at least one aperture when arranged therein.

In another aspect of the blow moulding equipment, the moulding equipment comprises a knife edge protruding into the moulding cavity from the at least one aperture. The knife edge is arranged for the separation of the section of the blow moulded element arranged within the moulding cavity when the equipment is in use from the section arranged within the aperture. The blow moulded element arranged within the moulding cavity is the intended product, a pinch line free container.

In a further aspect of the blow moulding equipment the moulding cavity is cylindrical and the knife edge is circular, and the knife edge is concentric with the at least one aperture and with the moulding cavity.

In yet another aspect of the blow moulding equipment according to the present invention the moulding cavity and the at least one aperture are arranged reversible movable away from and towards each other in the axial direction, where the axial direction should be understood in relation to central axis through the aperture. This movement provides for cutting and thereby separation of a blow moulded element prepared in the moulding cavity from the scrap in the aperture and optional outside the aperture by the cutting edge. In an additional aspect of the blow moulding equipment the at least one aperture comprises grabbing tools for grabbing a blow moulded element when the moulding cavity and the at least one aperture are moved away from each other. The grabbing tool holds the scrap section arranged in the aperture and allows for this section to be pulled away from the container prepared in the moulding cavity.

In one aspect of the blow moulding equipment according to the invention, the at least one blow conduit is a blow needle for puncturing a hollow parison to be arranged within the aperture, wherein the blow needle is movable between a retracted position wherein a tip of the at least one blow needle is at least in line with a wall of the aperture and an extended position wherein the tip of the at least one blow needle is extending from the wall into the aperture, and wherein the blow moulding equipment comprises a gas conduit in fluid communication with the blow needle for providing gas for the blow moulding.

In another aspect of the blow moulding equipment the at least two mould parts are arranged for being joined together without pinching a parison to be arranged therein.

The present invention further provides for use of the method according to the present invention for obtaining a liner for a composite pressure container, where the liner comprises no pinch line in the area adjacent to the at least one opening.

Also the present invention provides for use of a blow moulding equipment according to the present invention for producing a liner for a composite pressure container, where the liner comprises no pinch line in the area adjacent to the at least one opening.

The container prepared by the method of the present application can be utilized as a liner for a composite pressure container. The composite pressure container may for instance be used for storing and transporting LPG (liquefied petroleum gas), CNG (compressed natural gas), or hydrogen. By providing a method of producing a pinch line free liner the process of attaching the boss to the liner for composite pressure containers is improved and possibly simplified.

The term "inside" as used in "inside the moulding cavity" or "inside the aperture" or similar is used here to refer to a position within the structure surrounded by the mentioned structure. The term "outside" is used to refer to positions on the outside of a structure often protruding from the mentioned structure.

The term "circumference" as used here refers to the circumference of any cross section along a central axis of the elongated parison or the aperture.

The term "closed" as used herein in "closed blow moulding equipment" and "closed moulding equipment" refers to a structure that is closed in the sections, moulding cavity and aperture, which are to form the boundaries of the first moulded section and the second moulded section, except for an entrance into the aperture. The entrance allows the insertion of a parison.

The present invention relates to a method and equipment for preparing a liner for a composite pressure container. In one embodiment the liner is a cylindrical container with rounded end sections. An opening for installation of a valve or connection equipment is arranged in at least one of the end sections. Openings may be arranged in both end sections. A boss may be connected to the opening(s) to facilitate the connection of the valve.

BRIEF DESCRIPTION OF THE DRAWINGS

The present invention will be described in further detail with reference to the enclosed figures illustrating embodiments thereof.

FIG. 2a illustrates the inside of a mould including a parison in the situation prior to the onset of the blow moulding. One half of the mould is removed for illustrative purposes.

FIG. 2b shows a section of FIG. 2a in a side view.

FIG. 3a illustrates a perspective top view of a mould after the parison has been arranged therein but prior to the start of the moulding process.

FIG. 3b illustrates a perspective top view of a mould after the parison has been arranged therein and the shutter has been closed.

PRINCIPAL DESCRIPTION OF THE INVENTION

The present invention is explained in further detail with reference to the enclosed figures illustrating an embodiment of the invention. The same reference signs are used to refer to the same elements illustrated in different drawings.

Figure 1:
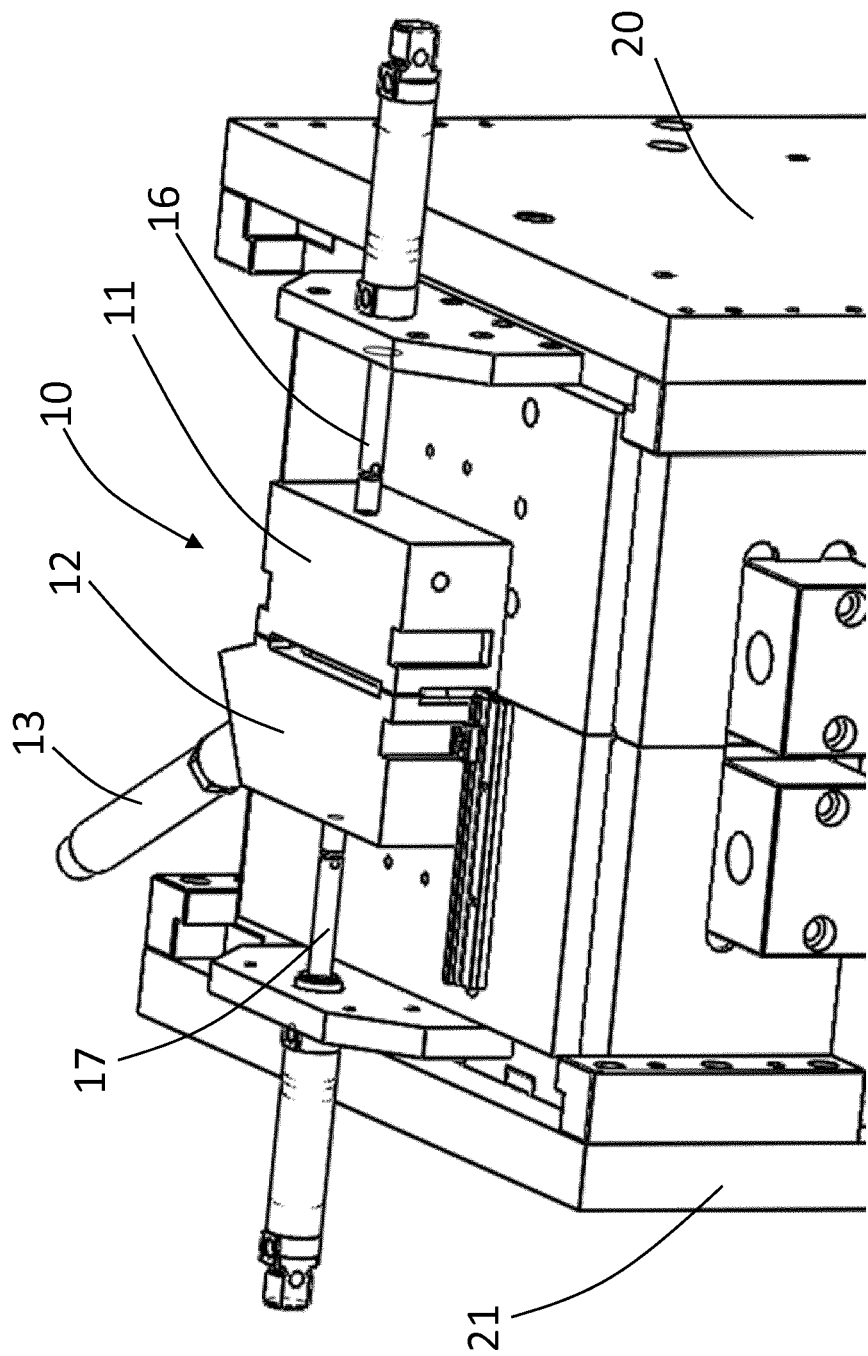
FIG. 1 illustrates the top section of a moulding equipment for use in a method according to the present invention.

FIG. 1 illustrates a perspective view of a top section of moulding equipment for preforming the method according to the present invention. Two mould parts 20 and 21 form a moulding cavity, not visible in this illustration. The moulding cavity defines the form of the blow moulded liner. An opening for arrangement of a parison within the moulding cavity is arranged between the two mould parts 20 and 21 at the top of the moulding cavity. The opening is covered by a shutter system 10 comprising a first shutter element 11 and a second shutter element 12. The first and second shutter elements 11 and 12 are arranged to be movable towards each other to a closed position as illustrated on FIG. 1 and to be movable away from each other to an open position providing an opening in the shutter system 10 at least equivalent to the opening the mould. Rods 16 and 17 are connected to the first and second shutter elements 11 and 12 respectively to provide for the movement of the shutter elements towards and away from each other to open and close the shutter. Further the shutter comprises a conduit 13 for supplying pressurised gas to the inside of a hollow parison arranged within the moulding equipment.

FIGS. 2a and 2b illustrate the part of the moulding equipment in a perspective and close up front view respectively. For illustrative purposes only one of the mould parts 21 is visible thereby the making the inside of the mould visible. The mould cavity 22 defines the intended form of the liner. The mould parts form an aperture 23 in the form of a through hole from the outside into the moulding cavity 22. The aperture comprises an entrance 24. A hollow tube shaped parison 30 is arranged in the moulding equipment so that it passes trough the aperture 23. The tube shape parison comprises at least one opening 31. A first section 36 of the parison is arranged inside the moulding cavity 22. The first section is shown as the section marked I. The opening 31 is arranged outside the moulding equipment in a third section 34 of the parison, also marked III. The diameter of the parison is marked $D_p$ on FIG. 2b. The diameter of the aperture in the mould is marked $D_c$ on FIG. 2b. $D_c$ is the smallest diameter of the aperture 23. $D_c$ is larger than or equal to $D_p$ such that the parison may be arranged within the moulding equipment as illustrated without being pinched by the mould parts 20 and 21 being brought in contact with each other as disclosed on FIG. 1. A second section 37 is arranged within the aperture 23 also shown as the section marked II.

In a preferred embodiment the moulding cavity further comprises a circular knife edge 25 surrounding the parison 36 at the inner entrance to the aperture. The knife edge 25 is arranged to define an opening in the container/liner after the blow moulding has been completed.

In the illustrations the parison is a cylindrical tube shaped element and the equipment is adapted to produce a cylindrical container with a circular opening, however the container may equally be in the form of an elongated container with four or more edges in the longitudinal direction, and similarly the outer circumference of the section of the container comprising the opening may comprise four or more corners. In connection with FIG. 2b different elements are described by their diameter such as $D_p$ and $D_c$, if the cross section of the different elements doesn't describe a circle the more general term circumference is used to described the similar term.

FIG. 3a illustrates the situation where the mould parts 20 and 21 are connected and the cavity inside the mould is formed and surrounds the first part 36 of the parison. A part of the second section 37 of the parison extends from the combined mould parts 20 and 21. The third section 34 is the extension of the parison outside the shutter system. The first and second shutter elements 11 and 12 are arranged on opposite sites of the entrance 24 to the aperture so that they can be moved towards each other and thereby pinching the third section of the parison outside the moulding equipment. FIG. 3b illustrates the situation after the shutter has been closed and the parison has been pinched between the shutter elements 11 and 12. A pinched third parison section 35 is thereby formed. This pinched third section 35 is arranged outside the shutter and is scrap that will not form part of the produced container/liner but which may be reused in the preparation of a new parison. Depending on the sharpness and pressure of the shutter elements the third section 35 may be fully separated from the remaining parison by the closing of the shutter. Preferably the pinched third section will continue to be connected to the second section arranged within the aperture, as also the second section will not form part of the final container or liner and keeping the second and third sections connected limits the number of scrap elements to be handled.

In the illustrated embodiment the shutter element 12 is kept in place by a block element 18 forming an integrated part of element 12 and a rail element 19 secured to the mould part 21, where the block element is connected to and slides on the rail element. This is only an illustration of one possible way of securing the shutter to the mould parts.

Although the moulding equipment illustrated here on the FIGS. 1, 2a, 2b, 3a and 3b comprises two mould parts 20 and 21 as well as a shutter system arranged on the top thereof a person skilled in the art will understand that equipment may include additional parts or be configured differently. The shutter system may optionally be an included in the mould parts.

Figure 4:
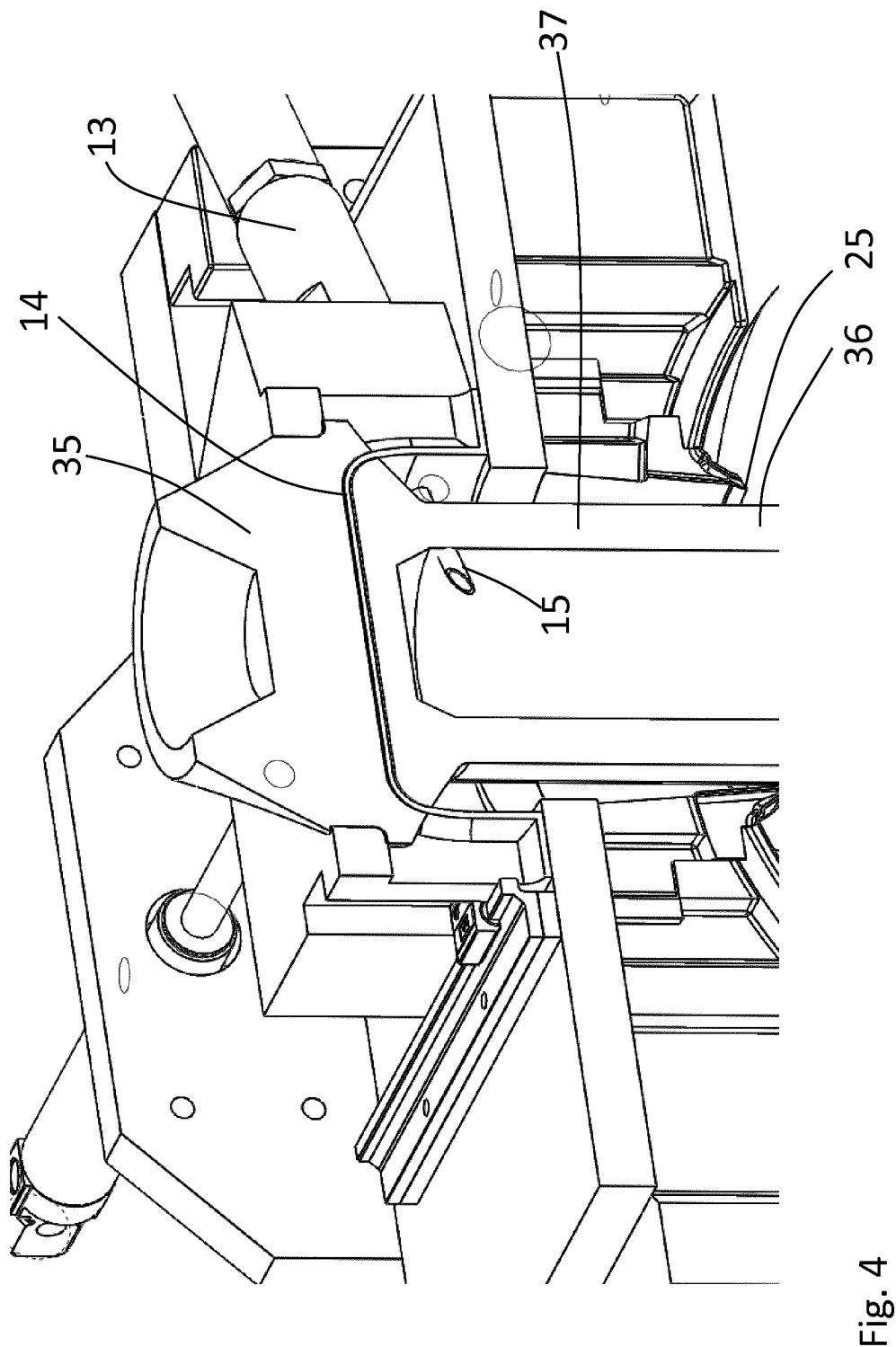
FIG. 4 is a cross sectional schematic view of the parison after the shutter has been closed and the parison has been punctured.

FIG. 4 is a cross-sectional view of the parison after the shutter has been closed. From the conduit 13 a blow needle 15 has punched the second parison section 37 arranged within the aperture. In this embodiment the shutter comprises a pinch edge 14 separating the pinched third section 35 of the parison from the second and first sections of the parison 37 and 36 arranged respectively in side the aperture and inside the moulding cavity. In one embodiment the blow needle 15 punctures the parison immediately after the shutter is closed.

The parison will normally be prepared from an extruding die, providing the thermoplastic material at conditions at which the initial form of the extruded parison is up held until the form is changed by the blow moulding method involving steps such as pinching and blow moulding. In one embodiment the extruding die includes gas supply openings for supplying support air to the parison until the shutter system is closed. This embodiment ensures that the closed volume formed within the parison, when the parison is pinched by the shutter system, is filled with gas. In the next step the parison within the second section, the aperture, is punctured by the blow needle. By ensuring that the closed volume is gas filled the puncturing is assisted in that the gas within the closed volume provides resistance towards the needle so that the parison is restricted from collapsing. The parison thereby retains it hollow shape inside the aperture and the moulding cavity. After the shutter system is fully closed the blow needle supplies additional gas to inflate the parison thereby blow moulding the container/liner.

Figure 5:
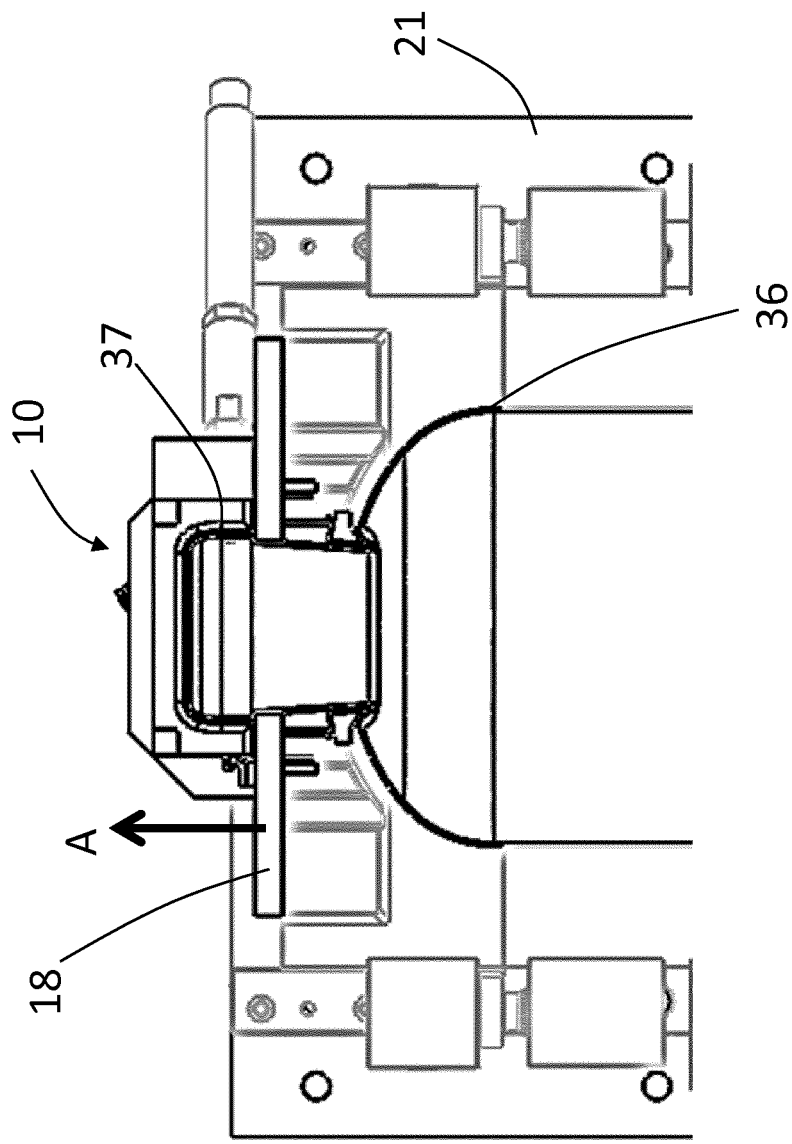
FIG. 5 is a cross sectional view which schematically illustrates the liner formed within the moulding cavity as a result of the blow moulding.

FIG. 5 is a cross sectional view of the blow moulded structure within the mould. The section 36 of the parison is transformed into the container/liner section. The Section 37 of the parison comprises the pinch line from the closing of the shutter but is not a part of the container/liner produced by the process. If the moulding equipment illustrated on FIG. 5 is opened the moulded container can be removed there from and the liner 36 can be separated from the section 37 by cutting of the section 37 including the pinch line. To ease the cutting the mould may be designed with a circular indentation providing a protruding cutting edge between the sections 36 and 37. Cutting with a knife must be performed with precision to limit the formation of chippings.

Figure 6:
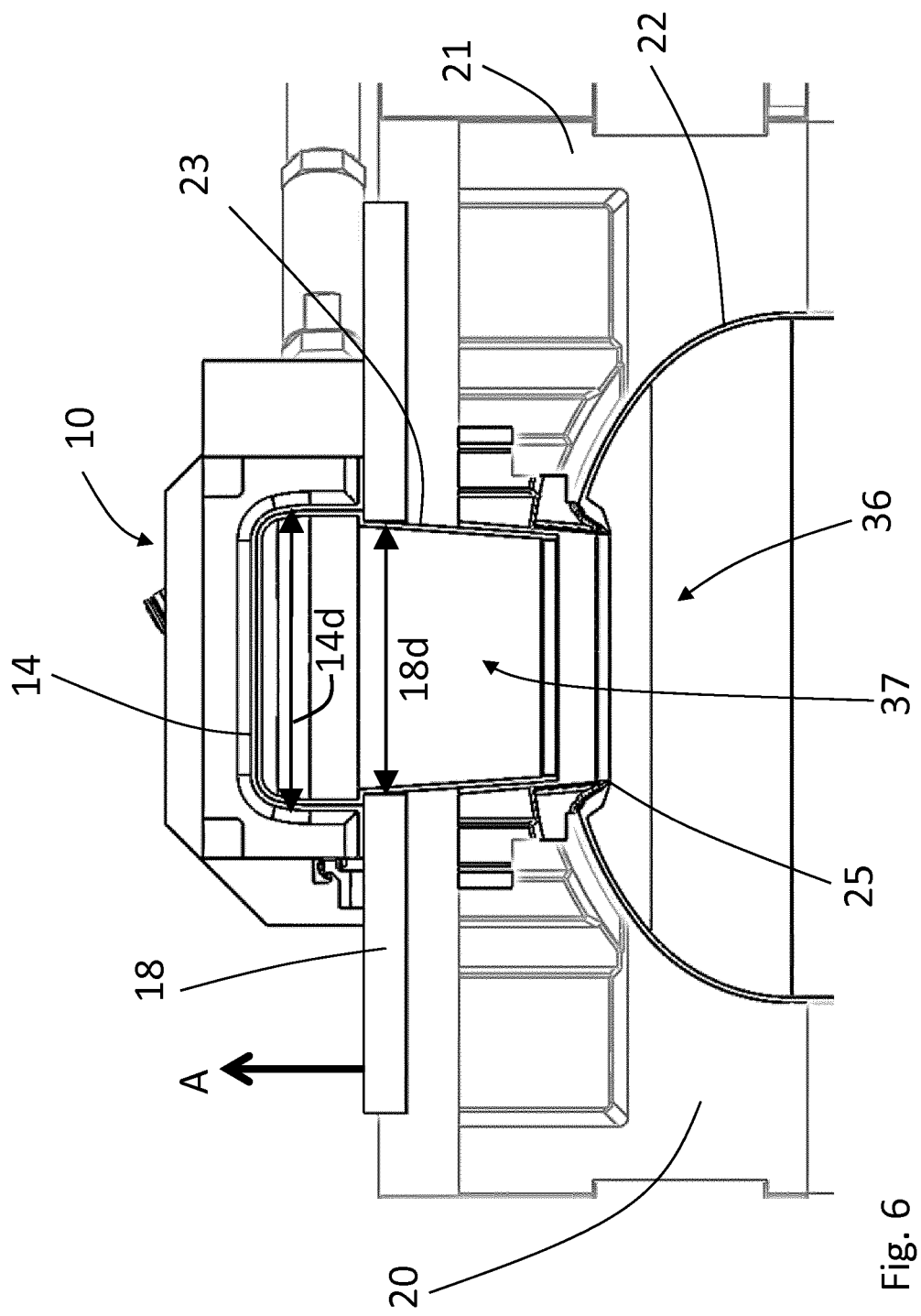
FIG. 6 is an illustration of a further embodiment of the present invention, wherein a second section is separated from the moulded liner.

FIG. 6 illustrates a further embodiment of the present invention wherein the section 37 including the pinch line is separated from the blow moulded liner 36 within the mould. The mould parts 20 and 21 form a circular cutting edge 25 when the mould is closed. The cutting edge 25 is protruding from the aperture 23 (not shown in FIG. 6) and into the moulding cavity 22. The cutting edge 25 is also illustrated on the FIGS. 2b and 4. Further the equipment comprises a base 18 on which the shutter 10 is arranged. The base 18, when the mould is closed, forms part of the outer section of the aperture 23 (not shown in FIG. 6). It includes a base plate opening with a diameter 18d. The pinch edge 14 in the shutter has a diameter 14d, the diameter 14d is larger than the diameter 18d of the aperture in the base 18, as illustrated on FIG. 6 this results in part of the outer section of the section 37 to extent to a diameter larger than the diameter of the aperture in the base 18. The equipment further comprises means for moving the base 18 in the direction of the arrow A also shown on FIG. 5 thereby separating the base 18 from the mould parts 20 and 21. When the base 18 including the shutter 10 is moved in the direction A away from the moulding cavity 22 the section 37 of the moulded element is engaged by the base in the area surrounding the aperture in the base 18 and the section 37 follows the movement of the base 18 in the direction A. The knife edge 25 cuts into the blow moulded element and thereby separates the section 37 including the pinch line from the container/liner 36. The separated sections are shown on FIG. 6 where the sections 36 and 37 are no longer connected. The cutting with the circular knife edge 25 will not result in chipping and the opening of the mould will provide a liner with no or limited need for after treatment before the next step of securing a boss to the liner.

Figure 7:
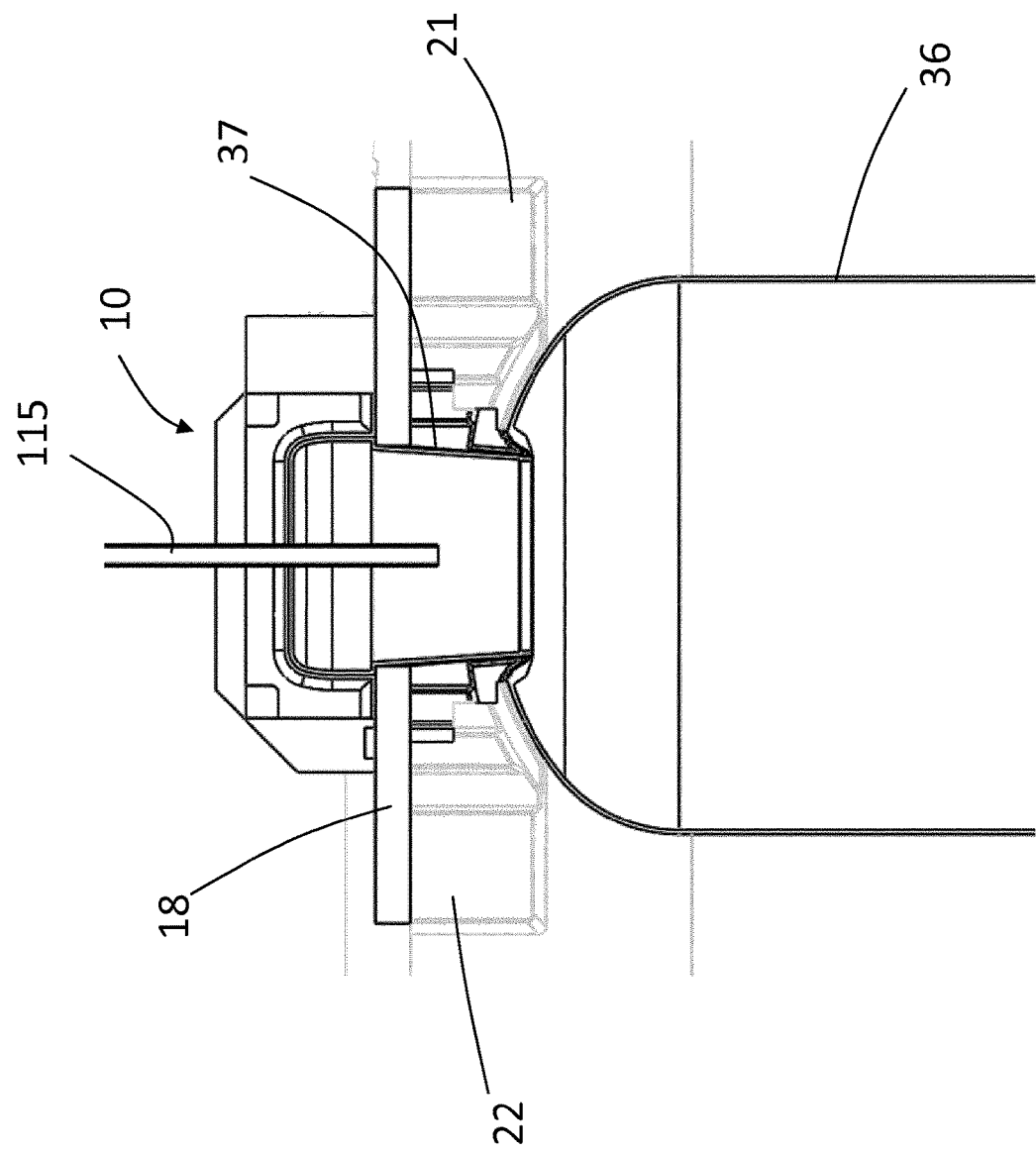
FIG. 7 illustrates another embodiment of the present invention with a blow pipe through the shutter system.

FIG. 7 illustrate another embodiment of the present invention wherein the blow conduit 115 is arranged extending from the top into the aperture 23 and the second blow moulded section 37. The blow conduit 115 can be arranged in this position before the shutter system 10 is closed and the pinch edge 14 will then surround the blow conduit 115. FIG. 7 illustrates the situation after the shutter system 10 has been closed and after pressurised gas has been blow into the parison from the blow conduit. When the parison is extruded into the aperture and the moulding cavity the blow conduit may be arranged in the hollow centre of the parison. A person skilled in the art will understand that the open end of the blow conduit 115 can be arranged at any position within the aperture or the moulding cavity to provide for blow moulding of a parison arranged surrounding the blow conduit.

In the drawings the method of preparing one cylindrical liner with one pinch line free opening at one end thereof is disclosed. The other end of the cylindrical liner may be prepared by any method including the method according to the present invention providing a cylindrical liner with openings at each end thereof or by a conventional method involving pinching of the parison by the closing of the mould and formation of a pinch line in the opposite end of the liner.

A person skilled in the art will appreciate that the present invention as defined by the enclosed claims can be utilized in a number of different ways without departing from the inventive concept.

The invention claimed is:

1. A method of blow moulding a container from a hollow, elongated parison of a thermoplastic material, wherein the method comprises:
arranging the parison in a closed moulding equipment comprising a moulding cavity and at least one aperture, wherein the at least one aperture provides an opening into the moulding cavity from outside the closed moulding equipment, wherein the circumference of the at least one aperture is larger than or equal to a circumference of the parison, such that a first section of the parison is arranged inside the moulding cavity, a second section of the parison is arranged within the at least one aperture and a third section of the parison is arranged outside the closed moulding equipment,
closing a shutter system around the third section of the parison, thereby pinching the parison and providing a closed volume inside the first and second sections of the parison,
arranging a blow conduit in fluid communication with the closed volume inside the second section of the parison,
blowing pressurised gas from the blow conduit into the first and the second section of the parison, thereby forming first and second blow moulded sections, wherein the first blow moulded section is the container, and
separating the second blow moulded section from the first blow moulded section, thereby providing an opening in the container.

2. The method according to claim 1, wherein the second blow moulded section is separated from the first blow moulded section before the moulding cavity is opened to remove the container.

3. The method according to claim 2, wherein the separating comprises cutting a connection between the first and the second moulded sections with a cutting edge arranged between the moulding cavity and the at least one aperture.

4. The method according to claim 1, wherein the method comprises supplying support air trough an opening of the parison before closing the shutter system.

5. The method according to claim 4, wherein the method comprises supplying support air through an extruding die, wherein the parison is being extruded from the extruding die.

6. The method according to claim 1, wherein the parison is tube shaped.

7. The method according to claim 1, wherein the blow conduit is a blow needle and the method comprises
puncturing the parison with the blow needle after closing the shutter system and
retracting the blow needle before separating the second blow moulded section from the first blow moulded section.

8. The method according to claim 1, wherein the blow conduit is arranged inside the hollow parison before closing the shutter system.

9. The method according to claim 1, wherein the moulding cavity and the aperture are formed by at least two mould parts being joined and wherein the method comprises joining the mould parts before or after arrangement of the parison, wherein the first, second and third sections of the parison are pinch free after the joining.

10. The method according to claim 9, wherein the closing of the shutter system is performed after the arrangement of the parison and after the joining of the mould parts.

11. The method according to claim 1, wherein the container is a liner for a composite pressure container.

12. Blow moulding equipment comprising
a moulding cavity,
at least one aperture in communication with the moulding cavity and comprising an entrance arranged outside of the moulding cavity,
a shutter system arranged at the entrance to the at least one aperture on the outside of the moulding cavity, wherein the shutter system is configured to reversible close and open, and during use when closed to pinch a parison protruding from said at least one aperture, and
at least one blow conduit adapted for providing pressurised gas to the inside of a hollow parison to be arranged within the blow moulding equipment,
wherein the moulding cavity and the aperture are formed by at least two mould parts to be joined together to form a closed blow moulding equipment and wherein the blow moulding equipment is arranged for joining the mould parts before closing of the shutter system,
wherein the moulding equipment comprises a knife edge protruding into the moulding cavity from the at least one aperture.

13. The blow moulding equipment according to claim 12, wherein the circumference of the at least one aperture is larger than or equal to the circumference of a parison intended for blow moulding in the blow moulding equipment.

14. The blow moulding equipment according to claim 12, wherein the moulding cavity is cylindrical and the knife edge is circular, and wherein the knife edge is concentric with the at least one aperture and with the moulding cavity.

15. The blow moulding equipment according to claim 12, wherein the moulding cavity and the at least one aperture are arranged reversible movable away from and towards each other in the axial direction.

16. The blow moulding equipment according to claim 15, wherein the at least one aperture comprises grabbing tools for grabbing a blow moulded element when the moulding cavity and the at least one aperture are moved away from each other.

17. The blow moulding equipment according to claim 12, wherein the at least one blow conduit is a blow needle for puncturing a hollow parison to be arranged within the aperture, wherein the blow needle is movable between a retracted position wherein a tip of the at least one blow needle is at least in line with a wall of the aperture and an extended position wherein the tip of the at least one blow needle is extending from the wall into the aperture, and wherein the blow moulding equipment comprises a gas conduit in fluid communication with the blow needle for providing gas for the blow moulding.

18. The blow moulding equipment according to claim 12, wherein the at least two mould parts are arranged for being joined together without pinching a parison to be arranged therein.

19. A method of blow moulding a liner for a composite pressure container from a hollow, elongated parison of a thermoplastic material, wherein the method comprises:
arranging the parison in a closed moulding equipment comprising a moulding cavity and at least one aperture, wherein the at least one aperture provides an opening into the moulding cavity from outside the closed moulding equipment, wherein the circumference of the at least one aperture is larger than or equal to a circumference of the parison, such that a first section of the parison is arranged inside the moulding cavity, a second section of the parison is arranged within the at least one aperture and a third section of the parison is arranged outside the closed moulding equipment, closing a shutter system around the third section of the parison, thereby pinching the parison and providing a closed volume inside the first and second sections of the parison, arranging a blow conduit in fluid communication with the closed volume inside the second section of the parison, blowing pressurized gas from the second blow moulded sections, wherein the first blow moulded section is the container, and separating the second blow moulded section from the first blow moulded section, thereby providing an opening in the container, where the liner comprises no pinch line in the area adjacent to at least one opening in the liner.

* * * * *